United States Patent
Yang et al.

(10) Patent No.: US 11,272,012 B2
(45) Date of Patent: Mar. 8, 2022

(54) ACTION PROCESSING ASSOCIATED WITH A CLOUD DEVICE

(71) Applicant: BANMA ZHIXING NETWORK (HONGKONG) CO., LIMITED, Kowloon (HK)

(72) Inventors: Jiangbo Yang, Beijing (CN); Chunhui Zhang, Hangzhou (CN); Yanming Cai, Hangzhou (CN); Ji Zhao, Beijing (CN); Wenchao Wang, Beijing (CN); Nan Zhang, Beijing (CN); Hujia Liu, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 0 days.

(21) Appl. No.: 16/215,167

(22) Filed: Dec. 10, 2018

(65) Prior Publication Data

US 2019/0182332 A1   Jun. 13, 2019

Related U.S. Application Data

(63) Continuation-in-part of application No. PCT/CN2017/087135, filed on Jun. 5, 2017.

(30) Foreign Application Priority Data

Jun. 17, 2016  (CN) .......................... 201610436563.4

(51) Int. Cl.
*H04L 12/26* (2006.01)
*H04L 12/24* (2006.01)
(Continued)

(52) U.S. Cl.
CPC .......... *H04L 67/125* (2013.01); *H04L 63/101* (2013.01); *H04L 67/02* (2013.01); *H04L 67/10* (2013.01)

(58) Field of Classification Search
CPC ....... H04L 67/125; H04L 67/10; H04L 67/02; H04L 63/101; H04L 67/025
(Continued)

(56) References Cited

U.S. PATENT DOCUMENTS

| 8,543,534 B2 | 9/2013 | Alves |
| 8,688,820 B1 * | 4/2014 | Bhogi ..................... H04L 69/40 709/224 |

(Continued)

FOREIGN PATENT DOCUMENTS

| CN | 103702402 | 4/2014 |
| CN | 103888261 | 6/2014 |

(Continued)

*Primary Examiner* — Kevin T Bates
*Assistant Examiner* — Golam Mahmud
(74) *Attorney, Agent, or Firm* — Van Pelt, Yi & James LLP

(57) ABSTRACT

Action processing associated with a cloud device is disclosed, including: in response to a trigger comprising receiving a forwarding instruction from a control device or receiving an event message from a first smart device, sending an action message to a second smart device, wherein the action message comprises at least an action identifier, wherein the action identifier corresponds to a control instruction to be executed at the second smart device; and receiving an action response message from the second smart device, wherein the action response message comprises the action identifier and an action status identifier, wherein the action status identifier is associated with an execution status of the control instruction at the second smart device.

21 Claims, 9 Drawing Sheets

(51) Int. Cl.
*H04L 29/08* (2006.01)
*G06F 15/16* (2006.01)
*H04L 9/08* (2006.01)
*H04L 67/125* (2022.01)
*H04L 29/06* (2006.01)
*H04L 67/02* (2022.01)
*H04L 67/10* (2022.01)

(58) Field of Classification Search
USPC .................................................... 709/203
See application file for complete search history.

(56) References Cited

U.S. PATENT DOCUMENTS

| | | | |
|---|---|---|---|
| 8,977,741 B1 | 3/2015 | Fredinburg | |
| 9,413,827 B2 | 8/2016 | Sharma | |
| 9,942,696 B2 | 4/2018 | Unter Ecker | |
| 9,989,942 B2 | 6/2018 | Glickfield | |
| 10,158,536 B2 | 12/2018 | Kim | |
| 10,171,586 B2 | 1/2019 | Shaashua | |
| 10,230,798 B2 | 3/2019 | Doraiswamy | |
| 10,419,930 B2 * | 9/2019 | Holland | H04L 9/12 |
| 2003/0017822 A1 | 1/2003 | Kissner | |
| 2003/0191793 A1 * | 10/2003 | Dolin, Jr. | H04L 67/10 |
| | | | 718/103 |
| 2004/0127198 A1 * | 7/2004 | Roskind | H04M 1/72451 |
| | | | 455/412.2 |
| 2004/0186891 A1 * | 9/2004 | Panec | H04L 67/10 |
| | | | 709/206 |
| 2007/0055750 A1 * | 3/2007 | Wang | H04L 12/2881 |
| | | | 709/219 |
| 2012/0243426 A1 * | 9/2012 | Matsui | H04L 1/1887 |
| | | | 370/252 |
| 2012/0323690 A1 * | 12/2012 | Michael | G01C 21/3461 |
| | | | 705/14.58 |
| 2013/0151084 A1 * | 6/2013 | Lee | B60R 25/2054 |
| | | | 701/48 |
| 2014/0164525 A1 | 6/2014 | Malik | |
| 2014/0188398 A1 * | 7/2014 | Cohen | G16H 40/60 |
| | | | 702/19 |
| 2014/0337431 A1 | 11/2014 | Naseh | |
| 2015/0067154 A1 * | 3/2015 | Ly | H04L 67/26 |
| | | | 709/224 |
| 2015/0100167 A1 * | 4/2015 | Sloo | H04L 67/24 |
| | | | 700/278 |
| 2015/0185713 A1 | 7/2015 | Glickfield | |
| 2015/0348403 A1 * | 12/2015 | Berelejis | H04L 12/2809 |
| | | | 367/197 |
| 2016/0088540 A1 * | 3/2016 | Wang | H04W 36/0016 |
| | | | 455/437 |
| 2016/0105360 A1 * | 4/2016 | Erickson | H04L 45/02 |
| | | | 370/392 |
| 2016/0105424 A1 * | 4/2016 | Logue | H04L 63/0823 |
| | | | 726/7 |
| 2016/0127928 A1 * | 5/2016 | McClure | G06F 11/0703 |
| | | | 455/425 |
| 2016/0173318 A1 | 6/2016 | Ha | |
| 2016/0226732 A1 * | 8/2016 | Kim | H04L 12/2807 |
| 2016/0316363 A1 * | 10/2016 | Li | H04L 12/2809 |
| 2017/0034564 A1 * | 2/2017 | Jamal-Syed | H04N 21/4351 |
| 2017/0083386 A1 | 3/2017 | Wing | |
| 2017/0156076 A1 * | 6/2017 | Eom | H04W 8/005 |
| 2017/0188248 A1 * | 6/2017 | Muller | H04W 76/15 |
| 2017/0196195 A1 * | 7/2017 | Wisdom | A01K 29/00 |
| 2019/0122457 A1 * | 4/2019 | Andritsopoulos | G07C 5/0808 |

FOREIGN PATENT DOCUMENTS

| | | |
|---|---|---|
| CN | 104104532 | 10/2014 |
| CN | 104202353 | 12/2014 |
| CN | 204014088 | 12/2014 |
| CN | 104302018 | 1/2015 |
| CN | 104601695 | 5/2015 |
| CN | 104679493 | 6/2015 |
| CN | 105182783 | 12/2015 |
| CN | 105182784 | 12/2015 |
| CN | 105632494 | 6/2016 |
| CN | 105676655 | 6/2016 |
| CN | 105704234 | 6/2016 |
| WO | 2016089262 | 6/2016 |
| WO | 2016184253 | 11/2016 |

* cited by examiner

ACTION PROCESSING ASSOCIATED WITH A CLOUD DEVICE

CROSS REFERENCE TO OTHER APPLICATIONS

This application is a continuation-in-part of and claims priority to International (PCT) Application No. PCT/CN2017/087135, entitled INTELLIGENT DEVICE CONTROL METHOD, APPARATUS AND DEVICE FOR INTERNET OF THINGS, filed Jun. 5, 2017 which is incorporated herein by reference for all purposes, which claims priority to China Application No. 201610436563.4, entitled A SMART DEVICE CONTROLLING METHOD, MEANS AND DEVICE FOR THE INTERNET OF THINGS, filed Jun. 17, 2016 which is incorporated herein by reference for all purposes.

FIELD OF THE INVENTION

The present application relates to a field of computer applications technology. In particular, the present application relates to techniques of using a cloud device to control a smart device for the Internet of Things environment.

BACKGROUND OF THE INVENTION

Intelligent hardware technology has been significantly furthered by the advent of smart phones. Traditional devices are transformed by combining hardware with software and then endowing them with smart functions. Products with intelligent hardware are generally exemplified by smart devices such as smart home appliances, smart automobiles, smart wearable devices, and smart medical devices, for example. These smart devices may interconnect through the cloud and the Internet of Things network. An important problem that arises when a control device exercises control over a smart device via the cloud or the Internet of Things is how the cloud and the smart device communicate. Conventionally, smart devices communicate with the cloud by using traditional network communication protocols, such as TCP/IP. However, these conventional protocols are often too complex for smart devices because they tend to involve many redundancies and require considerable client computing and/or networking resources for implementation. Moreover, such conventional protocols often cannot meet the intelligent hardware requirements of simplicity and speed.

SUMMARY OF THE INVENTION

Embodiments described herein provide flexible schemes of action processing associated with a cloud device.

The present application discloses techniques comprising:

In response to a trigger comprising receiving a forwarding instruction from a control device or receiving an event message from a first smart device, sending an action message to a second smart device, wherein the action message comprises at least an action identifier, wherein the action identifier corresponds to a control instruction to be executed at the second smart device; and Receiving an action response message from the second smart device, wherein the action response message comprises the action identifier and an action status identifier, wherein the action status identifier is associated with an execution status of the control instruction at the second smart device.

The action processing mechanism provided in the present application simplifies and also speeds up the communication between a cloud device and a smart device in implementing control interactions.

BRIEF DESCRIPTION OF THE DRAWINGS

Various embodiments of the invention are disclosed in the following detailed description and the accompanying drawings.

DETAILED DESCRIPTION

Figure 1:
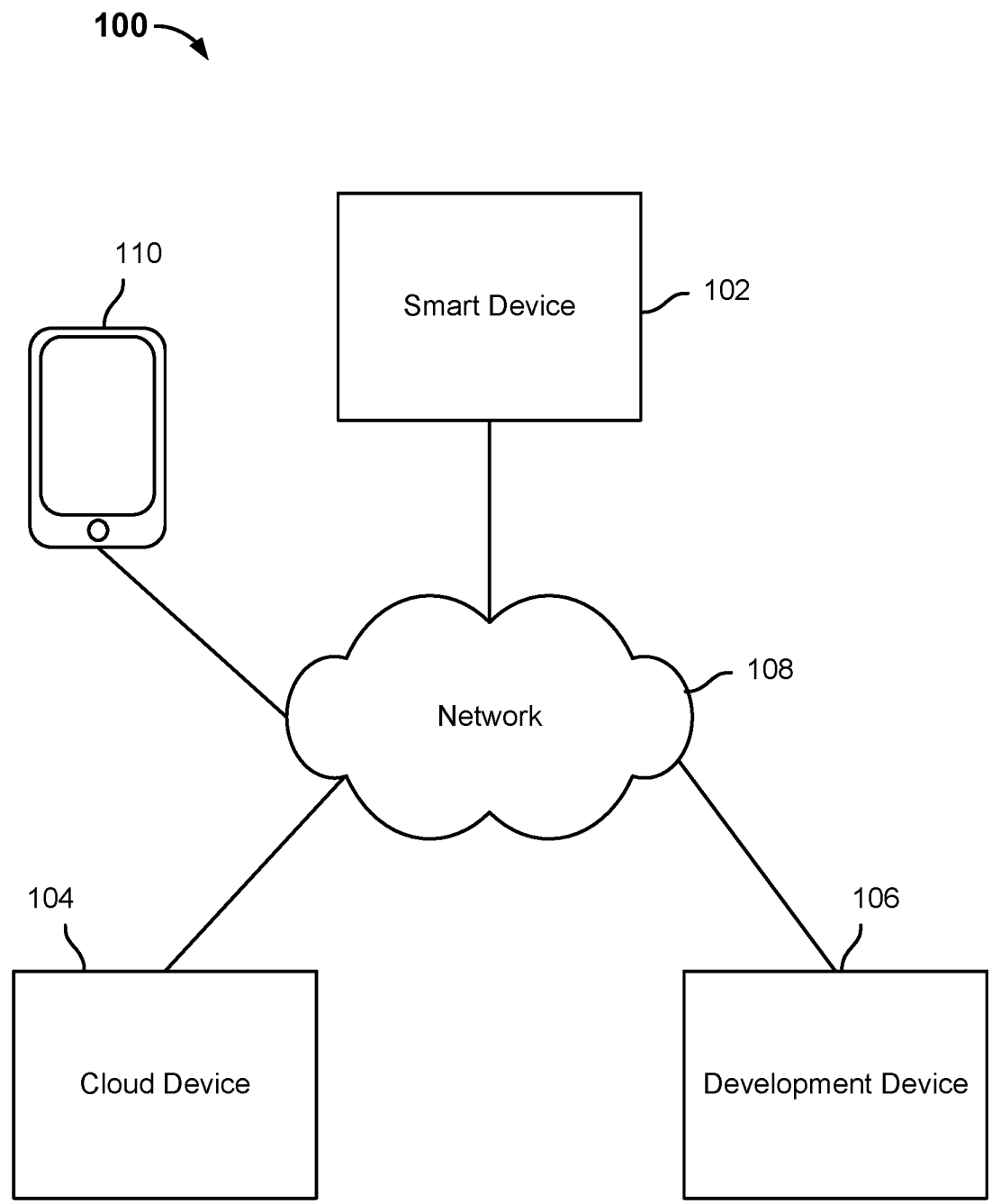
FIG. 1 is a diagram showing an embodiment of a system for action processing associated with a cloud device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to further clarify the goals, technical schemes, and advantages of the present invention, the present invention is described in detail below in light of the drawings and specific embodiments.

The terms used in embodiments of the present invention merely serve to describe specific embodiments and are not intended to restrict the present invention. "A," "said," and "the" or "this" as used in their singular form in embodiments of the present invention and the claims also are intended to encompass the plural form, unless otherwise clearly indicated by the context.

Please note that the term "and/or" used herein is merely a relationship describing related objects. It may indicate three kinds of relationships. For example, A and/or B may indicate the three situations of: only A exists, A and B both exist, and only B exists. In addition, the symbol "/" herein generally expresses an "or" relationship between the preceding and following objects.

Depending on context, the word "if" when used herein may be interpreted as "when" or "upon" or "in response to the determination that" or "in response to the detection of." Depending on the context, the phrase "upon determining" or "upon detecting (a stated condition or event)" may be understood as "when it is determined" or "in response to the determination that" or "upon detecting a stated condition or event" or "in response to the detection of (a stated condition or event)."

Embodiments of action processing associated with a cloud device are described herein. In response to a trigger, an action message is sent to a smart device. The action message comprises at least an action identifier. The action identifier corresponds to a control instruction to be executed at the smart device. An action response message is received from the smart device. The action response message comprises the action identifier and an action status identifier. The action status identifier is associated with an execution status of the control instruction at the smart device.

FIG. 1 is a diagram showing an embodiment of a system for action processing associated with a cloud device. In the example of FIG. 1, system 100 includes smart device 102, network 108, cloud device 104, development device 106, and control device 110. Network 108 may comprise high-speed networks and/or telecommunication networks (e.g., a wide area network, a local area network, the internet, or the internet using mobile communication technology). Cloud device 104 may comprise a cloud server or cloud device 104 may be a server cluster that includes multiple servers. Smart device 102 may be a device such as a smart home device, a smart network device, a smart automobile, a smart wearable device, a smart medical device, or any Internet-enabled device. Smart home devices may include, for example, intelligent hardware-based home appliances such as smart TVs, smart air-conditioning, smart water heaters, smart lamps, smart doors and windows, smart refrigerators, and smart air purifiers. Smart network devices may include, for example, switches and wireless access points that include intelligent hardware. Smart wearable devices may include, for example, smart watches, smart glasses, smart bracelets, smart helmets, augmented reality (AR) devices, and virtual reality (VR) devices, all of which include intelligent hardware. Smart medical devices may include, for example, smart thermometers, smart blood pressure monitors, and smart blood glucose meters, all of which include intelligent hardware. As will be described in further detail below, in various embodiments, events that are detected within smart device 102 are processed by a unit included in smart device 102 that is referred to as a "control center." In various embodiments, the control center of a smart device may be implemented using hardware and/or software. Smart device 102 may include one or more function modules, where each function module is configured to perform a corresponding specific function. Examples of a function module include a power module, control module, and detection module.

Figure 2:
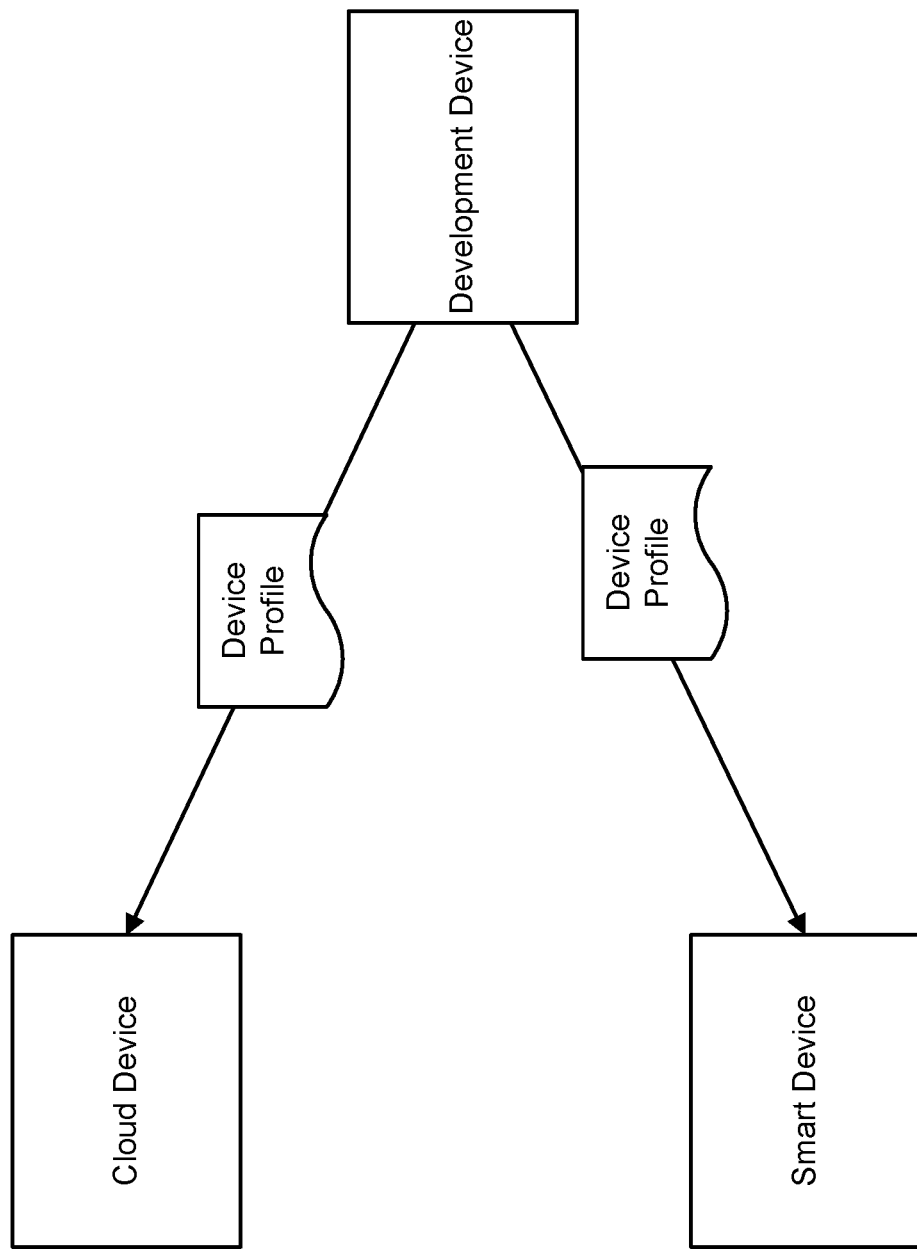
FIG. 2 shows a diagram of a development device sending a device profile to a cloud device and to a smart device.
Figure 3:
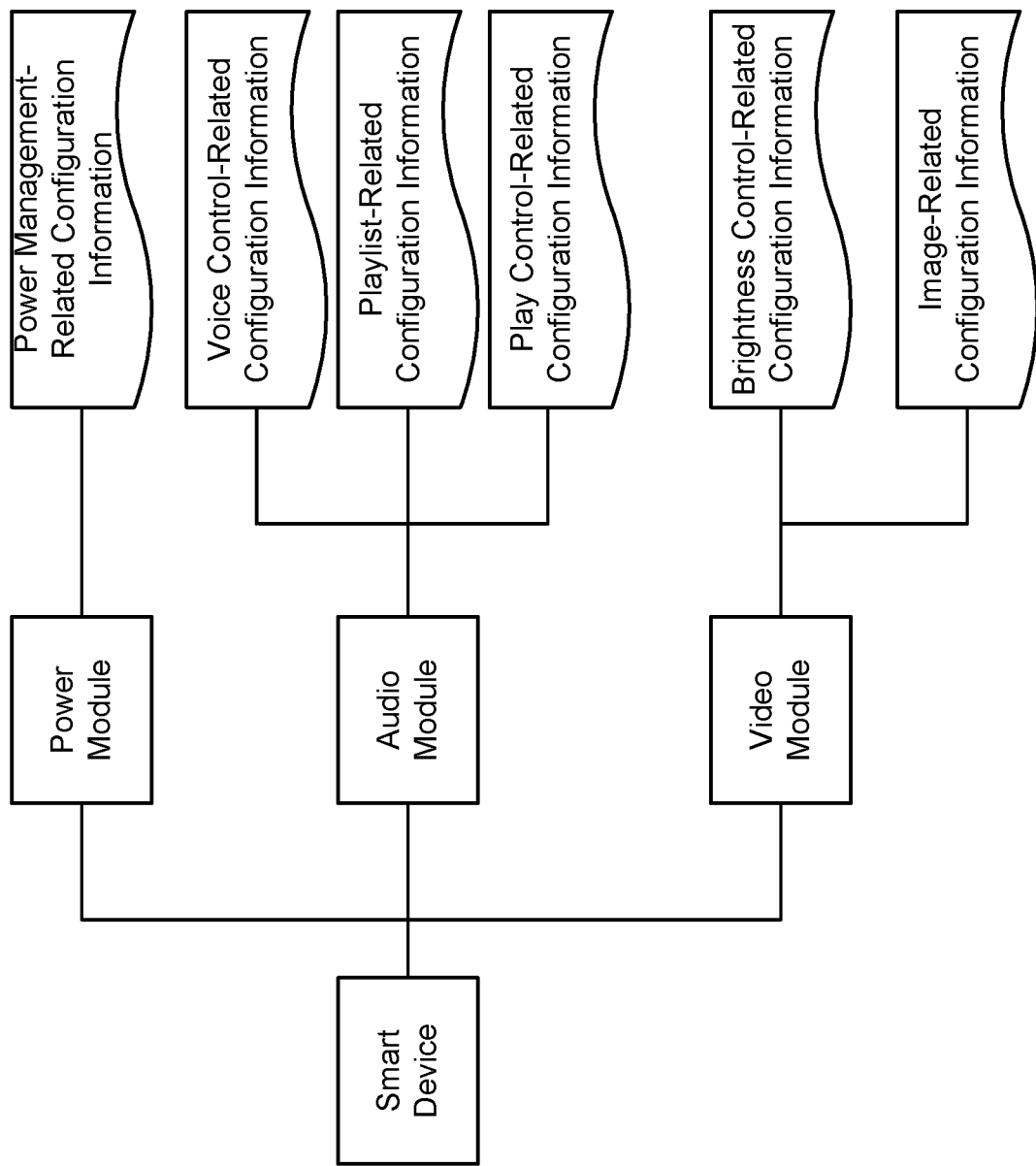
FIG. 3 shows an example device profile.

Development device 106 is configured to send device profiles to each one or both of smart device 102 and cloud device 104. FIG. 2 shows a diagram of a development device sending a device profile to a cloud device and to a smart device. The device profiles in FIG. 2 that are sent to the cloud device and to the smart device may include the same or different content. In various embodiments, a "device profile" comprises a document comprising a set of event-related configuration information. In various embodiments, a device profile may be organized in the form of a tree-structured (e.g., hierarchical) header file directory. The sub-node of each node in the tree-structured header file directory may be a sub-function (which is implemented by a corresponding functional module of a smart device) of the node. FIG. 3 shows an example device profile. In the example device profile of FIG. 3, the root node is a smart device. The sub-nodes include: power module, audio module, video module. The device profile may also have sub-nodes at more levels, but these will not be listed exhaustively in the figure. Each of the respective nodes corresponding to the power module, audio module, and video module has configuration information. For example, each of the respective nodes corresponding to the power module, audio module, and video module has one or more event identifiers (names) and their corresponding arguments. As shown in FIG. 3, the node corresponding to the power module may include configuration information relating to power management (stored as power_manage.h). The node corresponding to the audio module may include configuration information relating to voice control (voice_control.h), configuration information relating to the playlist (play_list.h), and configuration information relating to play control (play_control.h). The node corresponding to the video may include configuration information relating to brightness control (light_control.h) and configuration information relating to images (image.h). The ".h" is the format suffix for configuration information.

Returning to FIG. 1, in response to receiving a device profile from development device 106, smart device 102 is configured to perform event registration based on the device profile. In some embodiments, event registration performed at smart device 102 may include the control center analyzing a device profile and locally registering the event identifiers contained in the device profile. In some embodiments, event registration performed at smart device 102 may include the control center analyzing a device profile and locally registering the event identifiers contained in the device profile and also registering event arguments corresponding to the event identifiers that are contained in the device profile. In some embodiments, event registration performed at smart device 102 may further include: the control center analyzing a device profile and locally registering the correspondences between action identifiers and control instructions/control arguments contained in the device profile. In various embodiments, a "control instruction" comprises computer code or a command. In various embodiments, "control arguments" comprise arguments/variables/values that are to be used during the execution of the control instruction. In various embodiments, "registering" includes locally recording/storing the information to be registered (e.g., just event identifiers or event identifiers and corresponding event arguments). An event identifier may take on the form of a number (also referred to as an "event id"), an alphanumerical string (also referred to as an "event name"), or other appropriate type of identifier. For purposes of illustration, "event name" is the example event identifier that will be referred to in examples described below. The registered event names are associated with the events that are to be reported to cloud device 104 via event messages.

In response to receiving a device profile from development device 106, cloud device 104 is configured to perform event registration based on the device profile. In some embodiments, cloud device 104 may receive a device profile that is customized to a particular smart device. In some embodiments, cloud device 104 may receive a device profile that is configured for (e.g., general to) a particular type of smart device (e.g., smart lamps). Similar to the event registration that is performed at smart device 102, event registration at cloud device 104 involves locally registering the event identifiers contained in the device profile or locally registering the event identifiers contained in the device profile and also registering event arguments corresponding to the event identifiers. In some embodiments, cloud device 104 also registers destination device identifiers associated with each set of event names, event arguments, and/or action identifiers. The destination device identifiers identify smart devices to which an action identifier is to be sent. Event registration at cloud device 104 further includes registering the action identifiers corresponding to event information (e.g., various combinations of event names and/or event arguments related to the event names). In some embodiments, event registration at cloud device 104 further includes registering control instructions and/or control arguments corresponding to the action identifiers. In various embodiments, an "action identifier" comprises an identifier that identifies a control instruction that is to be performed at smart device 102 (e.g., in response to event messages that are received from smart device 102 or from another smart device other than smart device 102). By sending an action message (that includes an action identifier) to a smart device, cloud device 104 exercises control over the destination smart device because the destination smart device is configured to execute the control instruction associated with the action identifier that is included in the action message, which will be described in further detail below.

In some embodiments, event registration may be performed at smart device 102 in response to one or more triggers. Examples of such triggers include when smart device 102 is being activated, when smart device 102 is being upgraded, and when the device profile is received from development device 106. The mechanism of event registration at smart device 102 and/or cloud device 104 based on a device profile received from development device 106 enables the process of upgrading smart device 102 and/or cloud device 104 to become easier for a developer. For example, upgrading smart device 102 includes sending an updated device profile to smart device 102 to cause smart device 102 to handle action processing differently such as which events should be reported to cloud device 104 and/or which control instructions correspond to which action identifier. For example, upgrading cloud device 104 includes sending an updated device profile to cloud device 104 to cause cloud device 104 to handle action processing differently such as which control instruction should be performed at smart device 102 in response to a detected event at smart device 102. Given such a mechanism, the developer need only update the device profile that is to be sent to the smart device and/or the cloud device. If the developer wanted to update multiple smart devices in the same manner, the developer could just instruct development device 106 to send a copy of the same updated device profile to each of these smart devices instead of manually reconfiguring each of the smart devices or cloud devices. Furthermore, the mechanism of sending device profiles to the smart device and the cloud device allows the configurations of the two devices to be quickly synchronized without either device having to contact the other device to manually synchronize their stored configuration information. For example, when there is new event registration information, an updated device profile that includes this new event registration information may be sent to smart device 102 and cloud device 104. As such, cloud device 104 and smart device 102 may easily achieve new event registration through the registration mechanism described above. In response to receiving an updated device profile, cloud device 104 and/or smart device 102 may locally store only the content (e.g., event information and/or action messages) that is new relative to a previously received device profile and not redundantly register the content that is not new relative to a previously received device profile, thus saving storage space and communication bandwidth.

In various embodiments, control device 110 is configured to send a forwarding instruction to cloud device 104 to cause cloud device 104 to forward a control instruction to a smart device for which a corresponding destination smart device identifier is included in the forwarding instruction. For example, control device 110 comprises a smart phone or any other computing device. For example, a user of control device 110 may use a user interface presented at control device 110 to input a desired instruction to a specified smart device (e.g., smart device 102). The user inputs a control instruction and the destination smart device identifier may be sent to cloud device 104 as a forwarding instruction and the cloud device 104 is, in turn, configured to send a corresponding action message to the smart device that is identified by the destination smart device identifier of the forwarding instruction, where the action message includes an action identifier associated with the control instruction that was specified in the forwarding instruction.

In various embodiments, when the control center of smart device 102 detects an event and the event matches an event that is included in locally stored event registration information as an event that is to be reported to cloud device 104, smart device 102 sends an event message to cloud device 104, accordingly. The event message includes at least an event identifier and/or event arguments associated with the detected event.

As will be described in further detail below, in response to a forwarding instruction from control device 110 or an event message from smart device 102, cloud device 104 is configured to use its locally stored event registration information to determine whether to send an action message to smart device 102. In various embodiments, the action message to be sent from cloud device 104 to smart device 102 includes at least an action identifier, which corresponds to a control instruction to be performed by smart device 102, and/or one or more control arguments, which may be used by smart device 102 in executing the control instruction. In response to the action message, smart device 102 is configured to use its locally stored event registration information to determine a control instruction corresponding to the action identifier that is included in the received action message and execute the control instruction. At each of one or more various stages associated with handling the action message, including executing the control instruction corresponding to the action identifier included in the action message, smart device 102 is configured to send a corresponding action response message to cloud device 104. In various embodiments, each action response message includes the action identifier that was included in the action message and additionally, an action status identifier that indicates the current stage at which the action message has been handled at smart device 102.

In some embodiments, communication that is sent between a smart device and a cloud device uses User Datagram Program (UDP) protocol. Compared to Transmission Control Protocol (TCP), which is commonly used to maintain a long connection between two devices, UDP is more lightweight and less complex. Therefore, the use of UDP in sending action messages and action response messages back and forth between a smart device and a cloud device consume less network bandwidth than if TCP had been used. However, in some embodiments, TCP may be used to send communication between a smart device and a cloud device.

Figure 4:
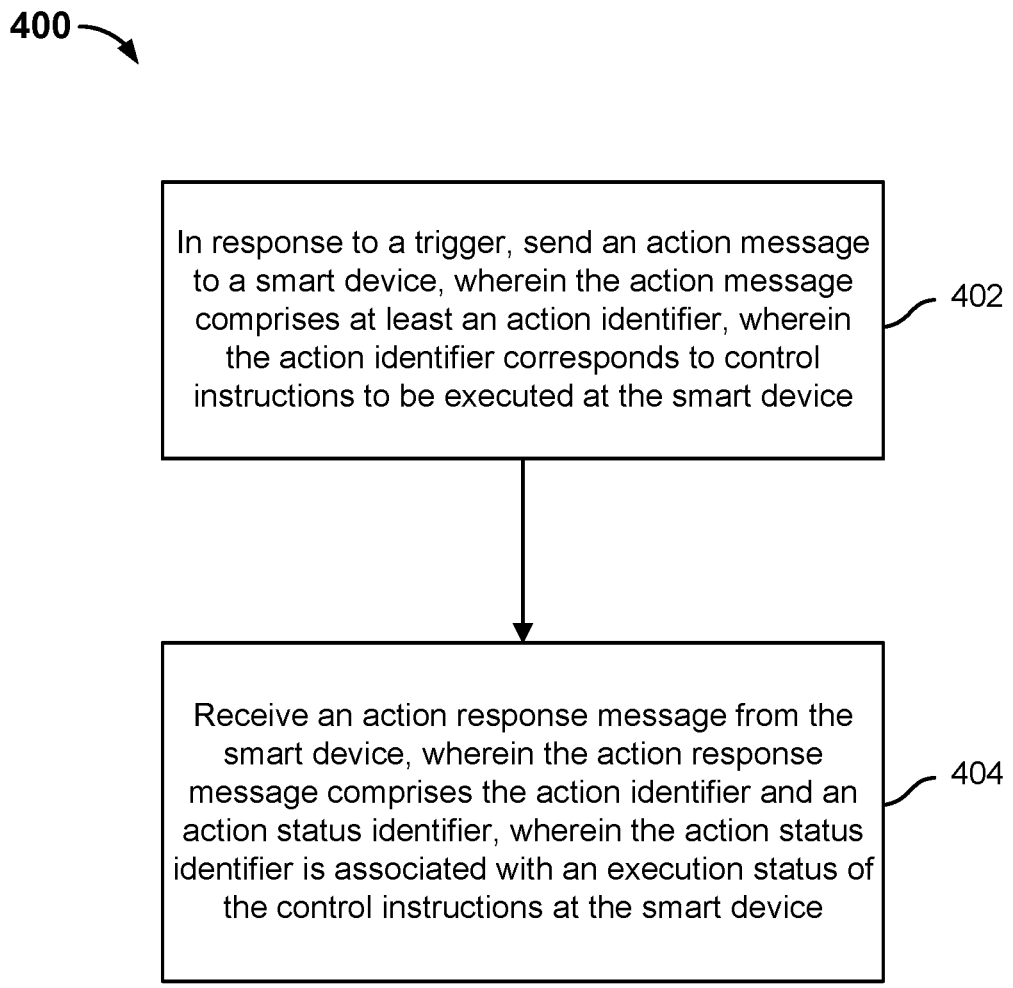
FIG. 4 is a flow diagram showing an embodiment of a process for action processing associated with a cloud device.

FIG. 4 is a flow diagram showing an embodiment of a process for action processing associated with a cloud device. In some embodiments, process 400 is implemented at cloud device 104 of system 100 of FIG. 1.

At 402, in response to a trigger, an action message is sent to a smart device, wherein the action message comprises at least an action identifier, wherein the action identifier corresponds to a control instruction to be executed at the smart device.

In various embodiments, one or more triggers can cause an action message to be sent to a smart device. The following are two example types of such triggers:

First type of trigger: A forwarding instruction is received from a control device. For example, the control device may be any smart terminal operable by a user, such as a smart phone, a PC, or a notebook computer. A control interface for the smart device may be provided to the user on the control device, such as via an application executing at the control device. A control instruction for a specific smart device may be sent to the cloud through this control interface.

The forwarding instruction may include one or more of the following: an action identifier corresponding to a control instruction, the control instruction itself, and the destination device identifier associated with the smart device to which the action identifier/control instruction is to be sent by the cloud device. The destination device identifier of the smart device may be any information capable of uniquely identifying the smart device. In various embodiments, the destination device identifier may be a unique Internet of Things identifier (ID) that is centrally allocated to smart devices by an identifier allocating device. For example, the ID is permanently set in a chip of the smart device when it is shipped from the factory. In various embodiments, the Internet of Things ID cannot be easily falsified or illicitly acquired. The cloud device uses the destination device identification information included in the forwarding instruction to send an action message to the smart device corresponding to the destination device identification information that is included in the forwarding instruction.

In the scenario associated with this first type of trigger, correspondences between each control instruction and their respective action identifier may be pre-established in the cloud device. Each control instruction has a corresponding action identifier. For example, the action identifier may be pre-registered locally in the cloud device and in smart devices. In some embodiments, if only action identifiers are registered in the cloud device, and if the action message includes only an action identifier, then the smart device may register action identifiers and control instructions and/or control arguments corresponding to action identifiers. If action identifiers and control instructions/control arguments corresponding to action identifiers are registered in the cloud device, then the action message may also include a control instruction/control argument(s) corresponding to an action identifier, in which case the smart device need only register action identifiers. It is also possible to register action identifiers and control instructions/control arguments corresponding to action identifiers in both the cloud device and smart devices, in which case the action message may or may not include control instructions/control arguments. As a result, the smart device would only need to look up in the locally stored event registration information the control instruction/control arguments corresponding to the action identifier that is included in the action message. In various embodiments described herein, it is assumed that both the smart device and the cloud device had locally registered the correspondences between control instructions/control arguments and action identifiers that are included in the device profile. An action identifier may include any descriptive information, e.g., action ID or action name, which may be used to indicate the corresponding action/control instructions/control arguments.

After the cloud device receives the control instruction sent by the control device, it determines the corresponding action identifier based on the correspondence between the action identifier and the control instruction. Then, the cloud device is configured to include the determined action identifier in an action message and send it to the smart device. Or, after determining the corresponding action identifier, the device uses locally registered event information as a basis to issue the action identifier and as well as one or more control arguments via the action message to the smart device.

Second type of trigger: An event message is received from the smart device. In some embodiments, a smart device sends an event message to the cloud device if a function module included in the smart device detects an event for which the event information that is locally registered at the smart device indicates should be reported to the cloud device. For example, a light detecting module and a switching module can both be function modules in a smart lamp. In some embodiments, each of the various function modules in the smart device conducts monitoring of the one or more events that it supports. As soon as a function module detects an event, the function module reports the event to the control center of the smart device. The detected event is reported by the function module to the control center of the smart device using at least an event name associated with the event. In some embodiments, at the smart device, the event name associated with the detected event is compared to stored event registration information to determine whether there is a match. As described above, event registration information comprises at least event names and corresponding event arguments that are locally registered at the smart device based on a device profile that was received at the smart device. If the event name associated with the event that is detected by the function module matches an event name that is included in the stored event registration information, then an event message that includes the event name and its corresponding one or more arguments in the stored event registration information is generated and sent to a cloud device.

After the cloud device receives such an event message from the smart device, the cloud device may perform the following examples of processing:

In a first example situation, the cloud device compares the event name of the event message to its own stored event registration information to determine a match. Then, the cloud device is configured to determine an action identifier, if any, corresponding to the event name within its stored event registration information and to send that action identifier in an action message to the smart device. That is, the cloud device, on the basis of the received event name, may exercise control over the smart device that had reported the event message. For example, a reported event related to "start speech recording" may cause the cloud device to send an action message to cause the smart device to perform speech recording.

In a second example situation, the cloud device has locally registered event names and corresponding destination device identifiers as well as control instructions. A destination device identifier may refer to the smart device that had sent the event message or to another device. An example scenario in which a destination device identifier refers to a smart device other than the one that had sent the event message to the cloud device applies when a first smart device event serves as a basis to cause the cloud device to exercise control over a second, different smart device. After a cloud device receives an event name reported by a smart device, it determines the destination device identifier and action identifier corresponding to the locally registered event name and sends the determined action identifier to the smart device corresponding to the destination device identifier using an action message.

In some embodiments, to improve security, the event message reported by a smart device to the cloud device may include device identifier information associated with the smart device that had sent the event message. After the cloud device receives the event message, it may first perform identity verification based on the device identification information included in the event message. That is, the cloud device may use the device identification information included in the event message to verify whether the smart device is one that is authorized to send event messages to the cloud device. For example, the cloud device may perform such a verification by comparing the device identification information included in the event message to a preset list of authorized device identifiers. If the device identification information included in the event message does not match any on a list of authorized device identifiers, the cloud device will discard the event message and not perform any action with respect to the event message.

A device identifier of the smart device may be any information that is capable of uniquely identifying the smart device. In some embodiments, a device identifier of the smart device is a unique Internet of Things identifier centrally allocated to smart devices by an identifier allocating device. The Internet of Things identifier may be permanently set in a chip of the smart device when it is shipped from the factory and therefore is not easily falsified or illicitly acquired. Authorized or legitimate device identifiers may be preset in the cloud device, in some embodiments. If smart device identifiers are centrally allocated by an identifier allocating device, the cloud device may acquire authorized device identifiers from the identifier allocating device in advance.

The two types of triggers that can cause the cloud device to send an action message to a smart device as described above are only examples and in practice, other triggers may also cause the cloud device to send an action message to the smart device.

The action message may include content fields in addition to the example content fields of action identifier, control arguments, and smart device identification information that are described above.

At 404, an action response message is received from the smart device, wherein the action response message comprises the action identifier and an action status identifier, wherein the action status identifier is associated with an execution status of the control instruction at the smart device.

In various embodiments, an "action response message" is an instance of a response issued by the smart device to the cloud device in response to the action message that was sent by the cloud device. The action identifier in the action response message is the same as the action identifier that was included in the action message sent from the cloud device and is used to indicate the relationships between the action response message and the original action message. The action status is used to indicate the smart device's action execution status with regard to the action message (e.g., specifically, the smart device's action execution status with regard to the action associated with the action identifier that is included in the action message). In various embodiments, the execution of an action is associated with various stages. The following are example stages associated with the execution of an action by a smart device:

First status type: a first status indicating that a first message has been received.

Second status type: a second status indicating that the preparatory work of the action to be executed according to the control instruction/control arguments corresponding to the action identifier has been completed.

Third status type: a third status indicating that the action to be executed according to the control instruction/control arguments corresponding to the action identifier has been completed.

Fourth status type: a fourth status indicating that an exception occurred in relation to the action executed according to the control instruction/control arguments corresponding to the action identifier.

Figure 5:
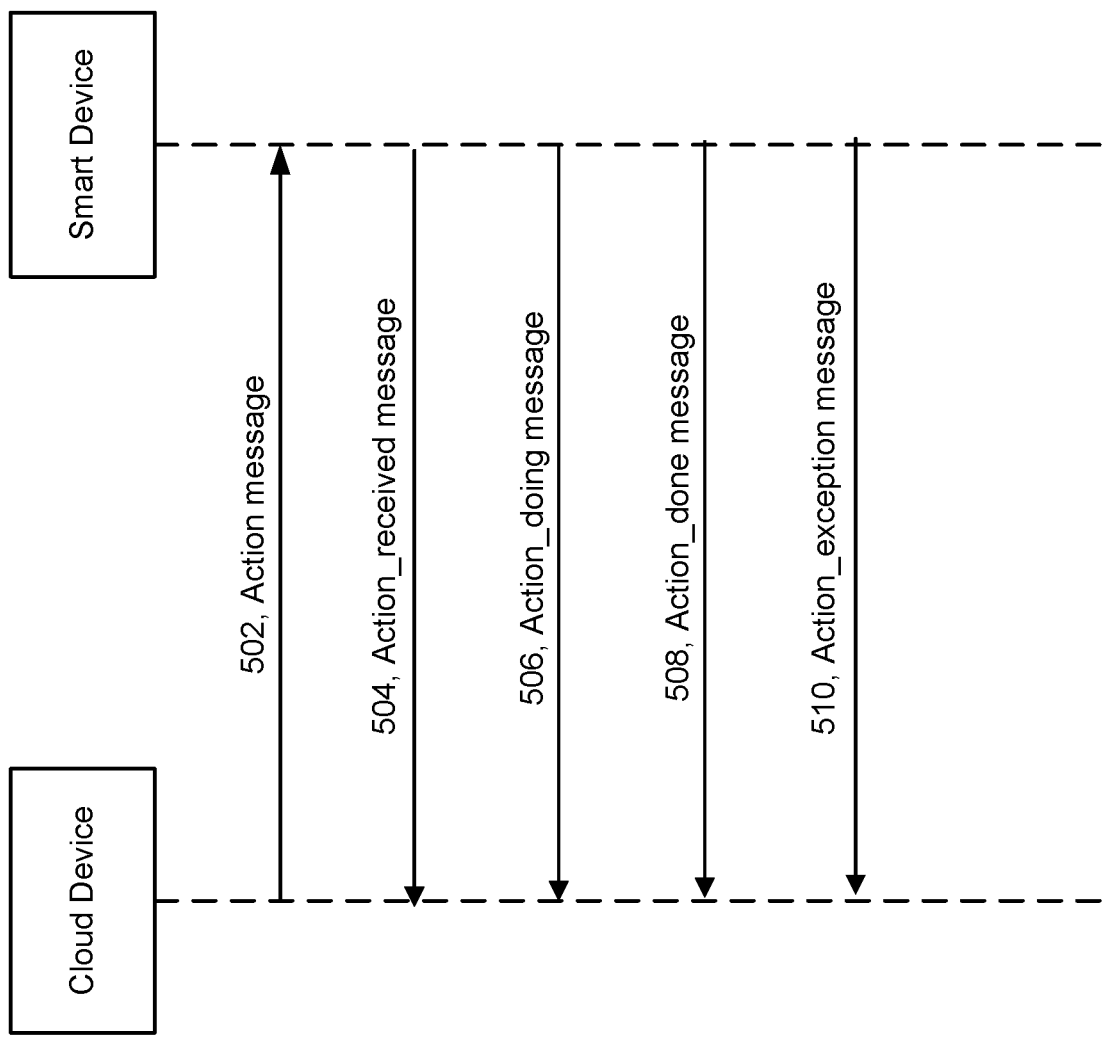
FIG. 5 is a sequence diagram showing example message exchanges between a cloud device and a smart device.

An example of how different instances of an action response message (each with a different action status identifier) can be sent from a smart device back to a cloud device after the cloud device had issued a single action message is shown in FIG. 5, below.

Returning to FIG. 4, while an action registration mechanism was already mentioned above, a detailed description of an example action registration mechanism is provided below. The actions (which are referred to by their identifiers, "action identifiers") that are described herein are associated with control information issued by a cloud device to one or more smart devices. Control instructions correspond to the various functions provided by smart devices. An action issued by a cloud device may correspond to one action, or it may correspond to a series of actions. Action messages and action response messages make up the types of messages that may be exchanged between a cloud device and a smart device over the performance of actions.

To differentiate between different actions, action identifiers (e.g., names) may be used to label and differentiate between different actions. As mentioned above, action identifiers may also correspond to specific control arguments. The control arguments may include action types, such as play, pause, etc. Some actions, such as pause, only require an action type, but other actions, such as play and increase volume, require other arguments, e.g., play object and magnitude of volume increase. These action identifiers and their corresponding control arguments may be defined by the device profile. The device profile may use the following format: "Action identifier: control arguments," where multiple control arguments may be separated by commas. For example:

action1 name: play, args: "Little Apple"
action2 name: pause

Where the action corresponding to "action1 name" is "play Little Apple," and the action corresponding to "action2 name" is "pause."

For example, a device profile may define event names and their corresponding event arguments using the following example format: "Event name: event arguments." The following example event name ("power_low") and corresponding event argument associated with the event of a smart device having less than a 10% charge in its battery may be included in the device profile:

event1 name: power_low, args: 10%

In some embodiments, a general device profile may be provided for one type of smart device. For example, the smart speakers of smart speaker A and smart speaker B, which are developed by different developers, both have play, pause, restore, volume-setting, and other functions. These two smart speakers may share the same device profile, which is a general device profile associated with the smart speaker type of smart devices. If each of the two smart speakers has its own distinctive functions, then a distinct device profile may be defined for each smart speaker to accommodate their respective functions. By allowing multiple smart devices to share a device profile and by permitting individual smart devices to receive customized device profiles, as appropriate, redundant efforts in generating device profiles for smart devices may be reduced while the configuration of smart devices using device profiles may be encouraged. At the same time, the flexible use of device profiles improves the popularization of intelligent hardware by lowering the threshold to develop and upgrade them.

In some embodiments, event registration at a cloud device comprises analyzing the device profile (e.g., associated with a certain type of smart device) and (e.g., for that type of smart device) locally registering each action identifier contained in the device profile, control arguments corresponding to the action identifiers, event identifiers, and event arguments corresponding to the event identifiers. By doing so, the cloud device can issue action messages and receive and process event messages with various smart devices.

In some embodiments, event registration at a smart device comprises the control center of a smart device analyzing a device profile, locally registering each action identifier contained in the device profile, control arguments corresponding to the action identifiers, event identifiers, and event arguments corresponding to the event identifiers. By doing so, the smart device can receive, process, and send event messages and action response messages to cloud devices.

In some embodiments, event registration at the smart device end differs from event registration at the cloud device in that event registration at the smart device may include registering function module specific configuration information (registering function module specific configuration information is sometimes referred to as "function module registration") within the smart device that has interactive relationships with certain event names. As described above, a "function module" refers to a part of a smart device that has a specific function. Examples of a function module include power modules, control modules, and detection modules. In some embodiments, a developer uses a development device to send a function module registration file (which may be part of or separate from a device profile) to the control center of the smart device or directly sets it up in advance in the control center of the smart device. The smart device control center can perform function module registration based on the function module registration file. The function module registration file may include initialization process information for each function module, with the result that the smart device can automatically run the initialization process for each function module at system startup. In addition, function module registration files may also include action identifiers/control instructions supported by various function modules. As a result, after the control center receives an action instruction (e.g., from a function module that had detected an event), it can use the action identifiers in the file as a basis to determine the function module for executing the action and provide control arguments corresponding to the action identifier to the appropriate function module for execution of the action.

FIG. 5 is a sequence diagram showing example message exchanges between a cloud device and a smart device. The smart device and cloud device of the example of FIG. 5 may be implemented, for example, using smart device 102 and cloud device 104 of system 100 of FIG. 1. Process 400 of FIG. 4 may be implemented based at least in part on the sequence diagram of FIG. 5.

At 502, an action message is sent from a cloud device to a smart device, wherein the action message comprises an action identifier and one or more control arguments to a smart device.

At 504, a first action response message is sent from the smart device to the cloud device, wherein the first action message comprises the action identifier and the first status information.

The first action message in this step is uniquely identified by the action identifier and first status information. The first status information is shown as "Action_received" in FIG. 5 to indicate that the action message was received at the smart device.

In 506, a second action response message is sent from the smart device to the cloud device, wherein the second action response message comprises the action identifier and the second status information.

The second action response message in this step is uniquely identified by the action identifier and the second status information. The second status information is shown as "Action_doing" in FIG. 5 to indicate that the preparatory work of the action to be executed according to the control arguments in the action message has been completed at the smart device.

In 508, a third action response message is sent from the smart device to the cloud device, wherein the third action response message comprises the action identifier and the third status information.

The third action response message in this step is uniquely identified by the action identifier and the third status information. The third status information is shown as "Action_done" in FIG. 5 to indicate that the execution of the action that was identified in the action message has been completed according to the control arguments that were identified in the action message.

In 510, a fourth action response message is sent from the smart device to the cloud device, wherein the fourth action response message comprises the action identifier and the fourth status information.

The fourth action response message in this step is uniquely identified by the action identifier and the fourth status information. The fourth action response information is shown as "Action_exception" in FIG. 5 to indicate that an exception occurred in relation to the action to be executed according to the control arguments in the action message. It should be noted that step 510 does not necessarily appear after step 508, but may be generated at any time after step 502. So long as an exception occurs, there is a possibility that it will be executed.

As for the cloud device, in some embodiments, it will resend the action message (that includes the action identifier and one or more control arguments) if it fails to receive an action response message that includes the "Action_received" status information from the smart device within a set period of time after sending the action message. In some embodiments, the cloud device will resend the action message if it fails to receive an action message including the "Action_doing" status information within a set period of time after receiving the action message that includes the "Action_received" status information. In some embodiments, the cloud device will resend the action message if it fails to receive an action response message including the "Action_done" status information within a set period of time after receiving an action message including the "Action_doing" status information. In some embodiments, the cloud device will resend the action message if it receives an action response message that includes the "Action_exception" status information. In addition, a resend upper limit may be set for the number of times that the cloud device should resend the action message to the smart device so that the action message will no longer be resent from the cloud device to the smart device once the upper limit is reached.

In some embodiments, the various action statuses received by the cloud device may be sent to another control device that had sent the forwarding instruction to the cloud device.

The following are examples of application scenarios of action processing between a smart device and a cloud device.

Application Scenario 1:

A user mobile phone sends a control instruction via the cloud to a smart speaker to play the audio of a song titled "Little Apple." Correspondences between action identifiers and control instructions were stored in advance in a cloud device. After the cloud device receives from the user mobile phone the user initiated event to play the "Little Apple" audio, it uses the aforesaid correspondences as a basis to determine the action identifier corresponding to the instruction. For example, the action identifier is:

action1 name: play, args: "Little Apple"

wherein "action1 name" is the action identifier and "play" and "args: 'Little Apple'" are the control arguments.

Then the cloud device determines the destination terminal device (i.e., smart speaker) based on the ID2 (an Internet of Things ID which is centrally allocated by an identifier allocating device and which uniquely identifies the smart device) included in the control instruction and sends the action message to the smart speaker. The action message may contain the following fields: action identifier and control arguments.

After receiving the action message, the smart speaker sends an action response message containing action_received as the status back to the cloud device. The action response message may include the following fields: action1 name and current action status (i.e., action_received). These two fields may uniquely identify the message currently returned by the smart speaker.

If the cloud device fails to receive back from the smart speaker the action response message containing action_received as the status within a set period of time, it may resend the action message.

After the smart speaker sends the action response message containing action_received as the status back to the cloud device, it begins the preparatory work for the action to be executed according to the control arguments in the action message. After it completes the preparatory work, it sends a second instance of an action response message containing action_doing as the status back to the cloud. The second instance of the action response message, which contains action_doing as the status may include the following fields: action1 name and current action status (i.e., action_doing). These two fields may uniquely identify the message currently returned by the smart speaker.

After executing the action of playing the "Little Apple" audio, the smart speaker sends a third instance of an action response message containing action_done as the status back to the cloud device. The third instance of the action response message, which contains action_done as the status may include the following fields: action1 name and current action status (i.e., action_done). These two fields may uniquely identify the instruction currently returned by the smart speaker.

If an exception occurs during the action execution process, the smart speaker may send a fourth instance of an action response message containing action_exception as the status back to the cloud. The fourth instance of the action response message, which contains action_exception as the status, may include the following fields: action1 name and current action status (i.e., action_exception). These two fields may uniquely identify the instruction currently returned by the smart speaker. In addition, the fourth instance of the action response message containing action_exception as the status may also include a parameter field indicating the specific type of exception.

The cloud device may learn the smart speaker's action execution status from the action status sent back by the smart speaker and thus ensure the monitoring of the execution status of each of the control instructions issued by the cloud device and executed on the intelligent hardware device. This guarantees the integrity and traceability of action execution. In addition, the cloud device may send the action status returned by the smart speaker back to the smart phone that sent the control instruction so that the user can promptly learn the execution status of the action.

Application Scenario 2:

This application scenario is a smart device-cloud device event mechanism.

The developer took relevant events of the speech control module in a smart speaker and pre-registered them in the IDJS CORE (control center) of intelligent hardware. Moreover, these relevant events were also pre-registered on the cloud device. One of these events is "start speech recording." When a smart speaker "start speech recording" event is triggered, the smart speaker sends the event to the cloud device. The cloud device may not provide any confirmation regarding the event itself, but it may perform subsequent processing based on the event, e.g., recognizing the recorded speech contained by the event, determining an action identifier and control arguments corresponding to the start speech recording instruction, placing them in an action message, and sending it.

Application Scenario 3:

After smart doors and windows detect a door opening event, the event is reported to the cloud device. The cloud device determines the action identifier, control arguments, and the destination terminal device corresponding to the event. For example, the determined action identifier is "action2 name," the control argument is "light," and the destination terminal device is a smart lamp. Thus, the cloud device uses an action message to send "action2 name" and its corresponding control argument to a smart lamp. After the smart lamp receives the action message, it may illuminate the smart lamp based on "action2 name" and its corresponding control argument in the message. Moreover, an action response message with a different status may be sent back.

Figure 6:
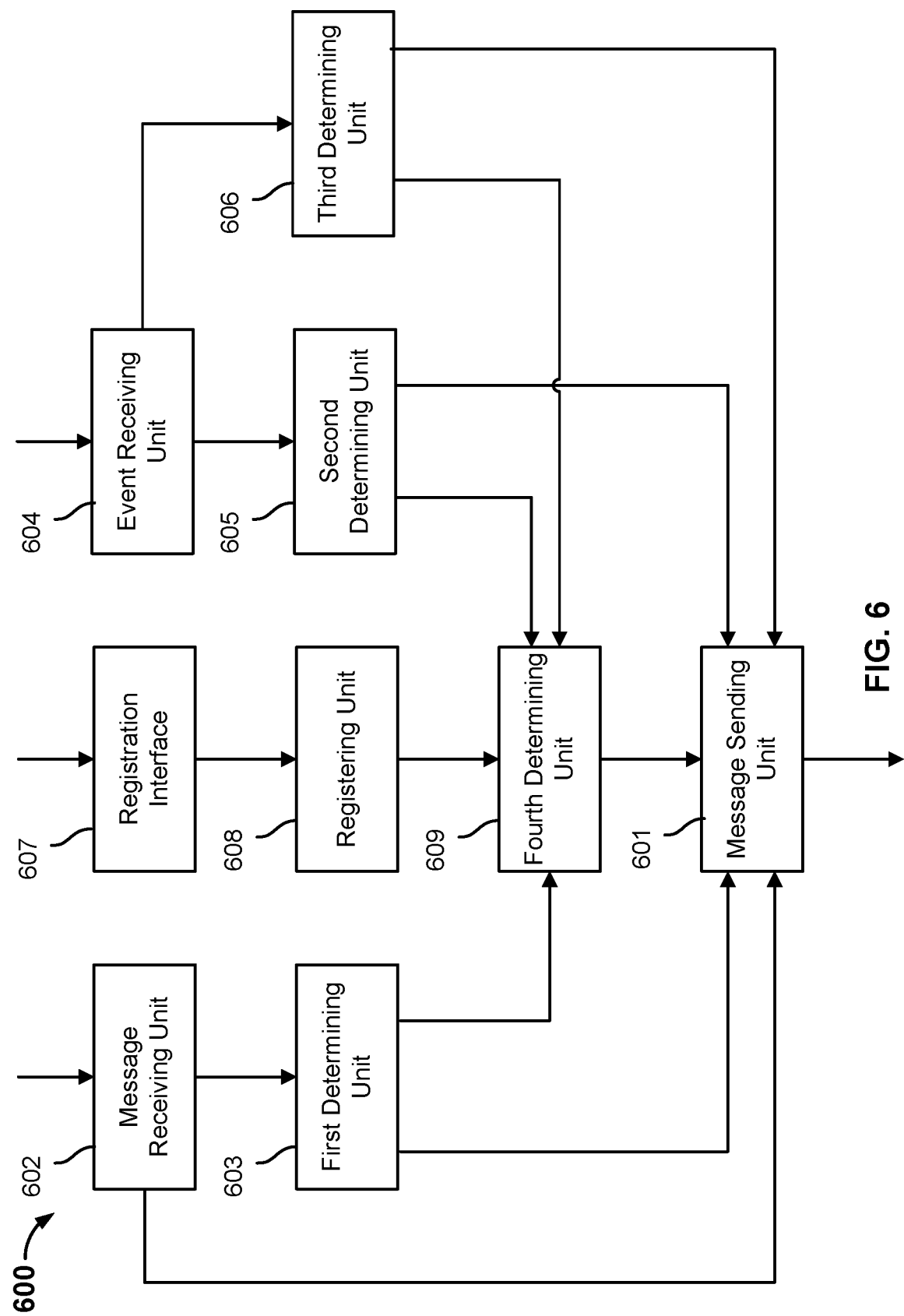
FIG. 6 is a structural diagram of an embodiment of a cloud device in accordance with some embodiments.

FIG. 6 is a structural diagram of an embodiment of a cloud device in accordance with some embodiments. Cloud device 600 includes message sending unit 601, message receiving unit 602, first determining unit 603, event receiving unit 604, second determining unit 605, third determining unit 606, registration interface 607, registering unit 608, and fourth determining unit 609.

The units can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices.

Message sending unit 601 is configured to send an action message to a smart device. The action message includes at least an action identifier.

Message receiving unit 602 is configured to receive one or more action response messages sent back by the smart device. Each action response message includes the action identifier and a corresponding action status. The action status includes information that indicates the action execution status of the action message by the smart device. Each action response message may be uniquely identified by its corresponding action identifier and action status.

The sending of an action message by a cloud device to a smart device may be triggered in the following two example situations, but is not limited to the following two example situations:

First type of trigger: A forwarding instruction is received from a control device. For example, the control device may be any smart terminal operable by a user, such as a smart phone, a PC, or a notebook computer. A control interface for the smart device may be provided to the user on the control device, such as via an application executing at the control device. A control instruction for a specific smart device may be sent to the cloud through this control interface.

The forwarding instructions may include one or more of the following: an action identifier corresponding to a control instruction, the control instruction itself, and the device identifier associated with the smart device to which the action identifier/control instruction is to be sent by the cloud device. The device identifier of the smart device may be any information capable of uniquely identifying the smart device. In various embodiments, the device identifier may be a unique Internet of Things identifier (ID) that is centrally allocated to smart devices by an identifier allocating device. For example, the ID is permanently set in a chip of the smart device when it is shipped from the factory. In various embodiments, the Internet of Things ID cannot be easily falsified or illicitly acquired. The cloud device uses destination device identification information included in the forwarding instruction to send an action message to the smart device corresponding to the destination device identification information that is included in the forwarding instruction.

Message sending unit 601 is configured to use the destination device identification information included in the control instruction to send an action message to the smart device corresponding to the destination device identification information.

First determining unit 603 is configured to use preset correspondences between control instructions and action identifiers as a basis to determine the action identifier corresponding to the received control instruction and for providing the determined action identifier to the message sending unit.

Second type of trigger: An event message is received from the smart device. In some embodiments, a smart device sends an event message to the cloud device if a function module included in the smart device detects an event for which the event information that is locally registered at the smart device indicates should be reported to the cloud device. For example, a light detecting module and a switching module can both be function modules in a smart lamp. In some embodiments, each of the various function modules in the smart device conducts monitoring of the one or more events that it supports. As soon as a function module detects an event, the function module reports the event to the control center of the smart device. The detected event is reported by the function module to the control center of the smart device using at least an event name associated with the event. In some embodiments, at the smart device, the event name associated with the detected event is compared to stored event registration information to determine whether there is a match. As described above, event registration information comprises at least event names and corresponding event arguments that are locally registered at the smart device based on a device profile that was received at the smart device. If the event name associated with the event that is detected by the function module matches an event name that is included in the stored event registration information, then an event message that includes the event name and its corresponding one or more arguments in the stored event registration information is generated and sent to a cloud device.

After the cloud device receives such an event message from the smart device, the cloud device may perform the following examples of processing;

In the first type of processing, after the event message is received from the smart device, an action message is sent back to that smart device. That is, event receiving unit 604 is configured to receive an event message reported by a smart device. Second determining unit 605 is configured to use preset correspondences between event names and action identifiers as a basis to determine the action identifier corresponding to the event name included in the event message that was received by event receiving unit 604 and provide the determined action identifier to message sending unit 601.

In the other type, the smart device that reported the event and the smart device to which the action message is issued are not the same smart device. That is, event receiving unit 604 is configured to receive an event message reported by a smart device. Third determining unit 606 is configured to use preset correspondences between event names on the one hand and action identifiers and destination device identification information on the other as a basis to provide the action identifier corresponding to the event to message sending unit 601.

In some embodiments, it is possible to implement remote registration of an action at cloud device 600 by opening a registration interface to a development device. That is, registration interface 607 is configured to receive a device profile sent by the development device. Then registering unit 608 is configured to use the device profile as a basis to locally register the action identifier or to locally register the action identifier and control arguments corresponding to the action identifier.

If registering unit 608 is configured to locally register the action identifier and control arguments corresponding to the action identifier, then fourth determining unit 609 is configured to obtain locally registered control arguments corresponding to the action identifier and provide the control arguments to message sending unit 601. At this point, the action message sent by message sending unit 601 may further include control arguments.

Regardless of which of the above situations is adopted, an identity verifying unit (not shown in drawing) may, in order to ensure security of the interactions, determine whether the identification information of the destination terminal device corresponding to the action message is an authorized/legitimate device identifier. If the identity verifying unit determines that the identification information of the destination terminal device is not an authorized/legitimate device identifier, then message sending unit 601 is prohibited from sending an action message to the smart device. If the sending of an action message is triggered by a forwarding instruction from a control device, then the destination terminal device corresponding to the action message is the smart device corresponding to the destination device identifier contained in the control message. If the sending of an action message is triggered by an event that is detected by the same smart device, then the smart device that sends the event message is also the destination terminal device corresponding to the action message. If the sending of an action message is triggered by an event message that originates from another smart device, then the smart device corresponding to the destination device identifier determined according to the event message is the destination terminal device corresponding to the action message.

In some embodiments, a preset of authorized/legitimate device identifiers is stored at cloud device 600. The authorized/legitimate device identifiers may be unique Internet of Things IDs that are centrally allocated to all smart devices by an identifier allocating device. The ID is permanently set in a chip of the smart device when it is shipped from the factory so that it cannot be easily falsified or illicitly acquired. If smart device identifiers are centrally allocated by an identifier allocating device, cloud device 600 may acquire legitimate device identifiers from the identifier allocating device in advance.

An action status included in an action response message received by message receiving unit 602 may include, but is not limited to the following:

First status type: a first status indicating that a first message has been received.

Second status type: a second status indicating that the preparatory work of the action to be executed according to the control instruction/control arguments corresponding to the action identifier has been completed.

Third status type: a third status indicating that the action to be executed according to the control instruction/control arguments corresponding to the action identifier has been completed.

Fourth status type: a fourth status indicating that an exception occurred in relation to the action executed according to the control instruction/control arguments corresponding to the action identifier.

If message receiving unit 602 has not received an action response message that includes the first status type within a first set period of time after message sending unit 601 sent the action message, then message sending unit 601 is configured to resend the action message.

If message receiving unit 602 has not received an action response message that includes the second status type within a second set period of time after receiving the action response message that includes the first status, then message sending unit 601 resends the action message.

If message receiving unit 602 has not received an action response message containing the third status type within a third set period of time after receiving the action response message that includes the second status, then message sending unit 601 resends the first action message.

If message receiving unit 602 receives a second action message that includes the fourth status, then message sending unit 601 is configured to resend the action message.

In addition, a resend upper limit may be set for resending the action message to the smart device. Once the resend upper limit has been reached, cloud device 600 will no longer resend the action message to the smart device.

Figure 7:
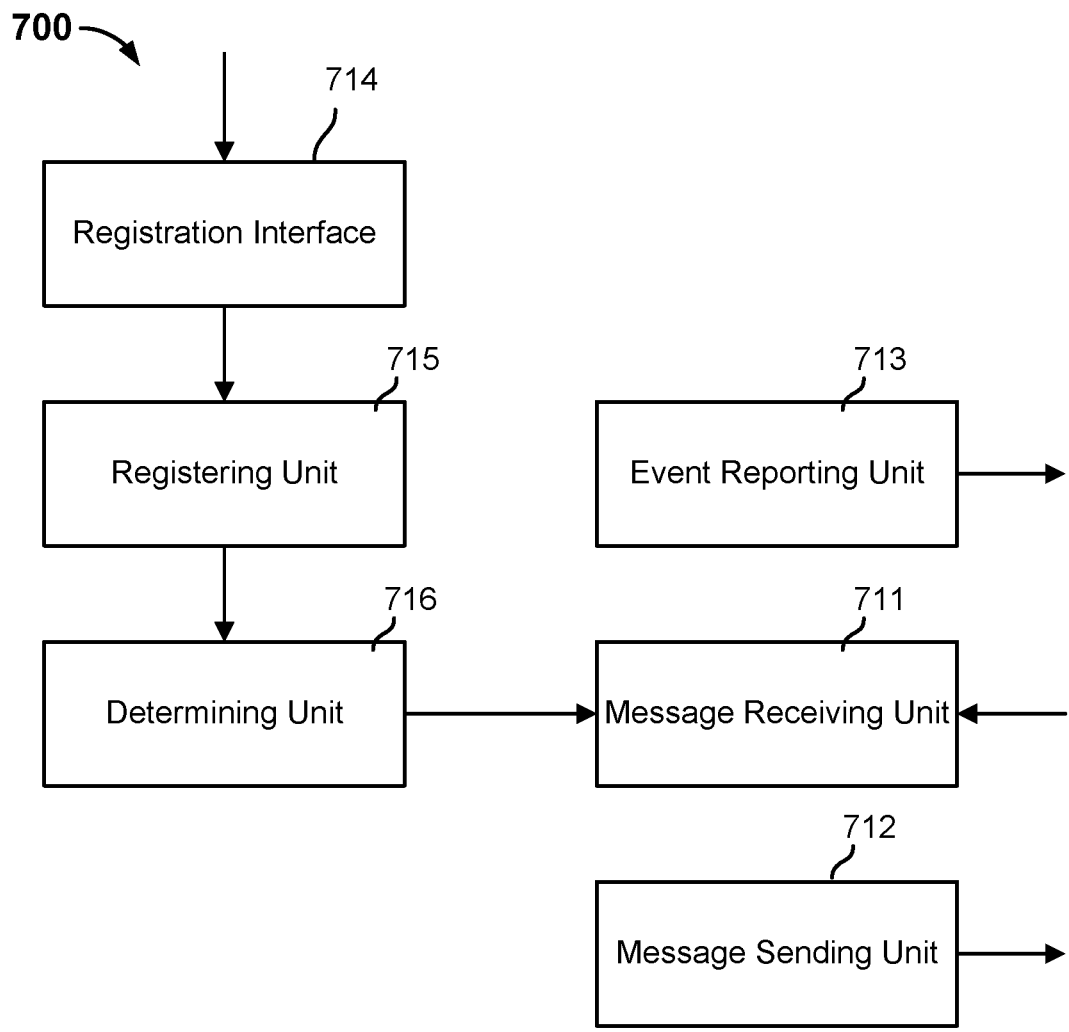
FIG. 7 is a structural diagram of an embodiment of a smart device in accordance with some embodiments.

FIG. 7 is a structural diagram of an embodiment of a smart device in accordance with some embodiments. Smart device 700 includes message receiving unit 711, message sending unit 712, event reporting unit 713, registration interface 714, registering unit 715, and determining unit 716.

Message receiving unit 711 is configured to receive an action message from a cloud device. This action message includes at least an action identifier.

Message sending unit 712 is configured to send an action response message back to a cloud device. Each action response message includes the action identifier and a corresponding action status. The action status includes information that indicates the action execution status of the action message by the smart device. Each action response message may be uniquely identified by its corresponding action identifier and action status.

Event reporting unit 713 is configured to report events detected at smart device 700 to the cloud device.

Smart device 700 includes an interface to receive configuration information, such as device profiles, for example, from developers. That is, registration interface 714 is configured to receive device profiles sent by a development device. Registering unit 715 is configured to locally register action identifiers that are included in the received device profile(s) or locally register action identifiers and control arguments corresponding to action identifiers that are included in the received device profile(s).

If the action message does not include a control argument corresponding to the action identifier, then the action identifier and a control argument corresponding to the action identifier should be registered during the registration process described above. Determining unit 716 uses the action identifier included in the action message to determine the control argument(s) corresponding to the locally registered action identifier so that the smart device can use the determined control argument(s) to execute the corresponding action.

If the action message includes one or more control arguments corresponding to the action identifier in addition to the action identifier, then the registration process described above will only require locally registering the action identifiers that are included in the device profile because smart device 700 can simply control argument(s) included in the action message to execute the corresponding action.

In some embodiments, smart device 700 is configured to implement function module registration in addition to event registration.

Registration interface 714 is configured to obtain a function module registration file that was sent by a development device or that was pre-configured in smart device 700. Registering unit 715 is configured to perform function module registration based on the function module registration file. The function module registration file may include initialization process information for each function module, which is used for automatically running the initialization process for each function module at smart device system startup. Or the function module registration file may also include action identifiers supported by various function modules. As a result, after the control center receives an action instruction (e.g., from a function module that had detected an event), it can use the action identifiers in the file as a basis to determine the function module for executing the action and provide control arguments corresponding to the action identifier to the appropriate function module for execution of the action.

An action status that is included in action response message may include, but is not limited to the following:

First status type: a first status indicating that a first message has been received.

Second status type: a second status indicating that the preparatory work of the action to be executed according to the control instruction/control arguments corresponding to the action identifier has been completed.

Third status type: a third status indicating that the action to be executed according to the control instruction/control arguments corresponding to the action identifier has been completed.

Fourth status type: a fourth status indicating that an exception occurred in relation to the action executed according to the control instruction/control arguments corresponding to the action identifier.

Figure 8:
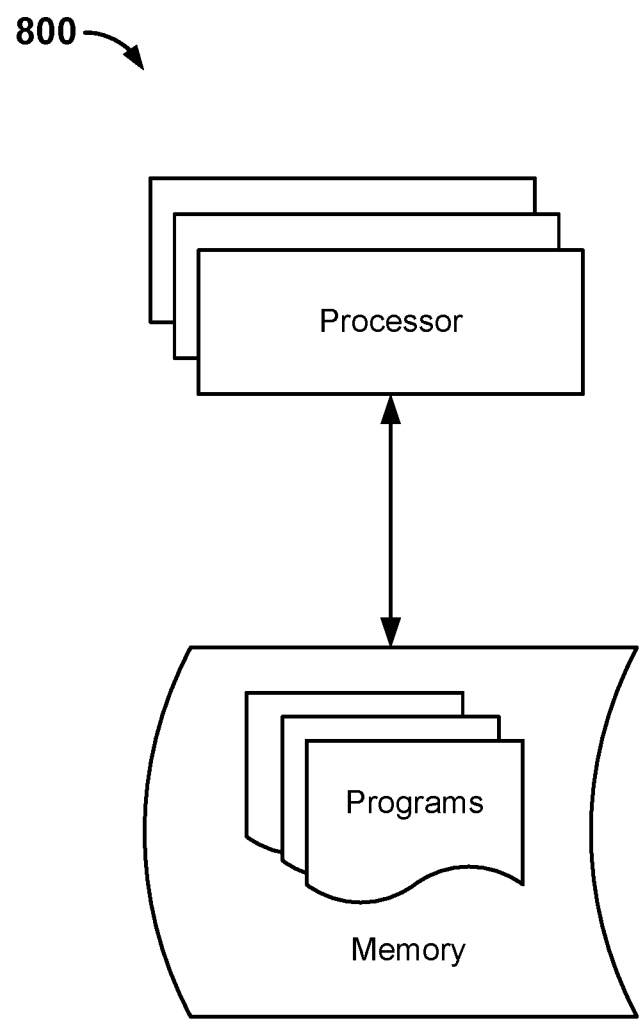
FIG. 8 is a structural diagram showing an embodiment of a system for action processing.

FIG. 8 is a structural diagram showing an embodiment of a system for action processing. System 800 includes one or more processors and further comprises memory and one or more programs. The one or more programs are stored in the memory and are executed by the one or more processors to implement the processes described above.

Figure 9:
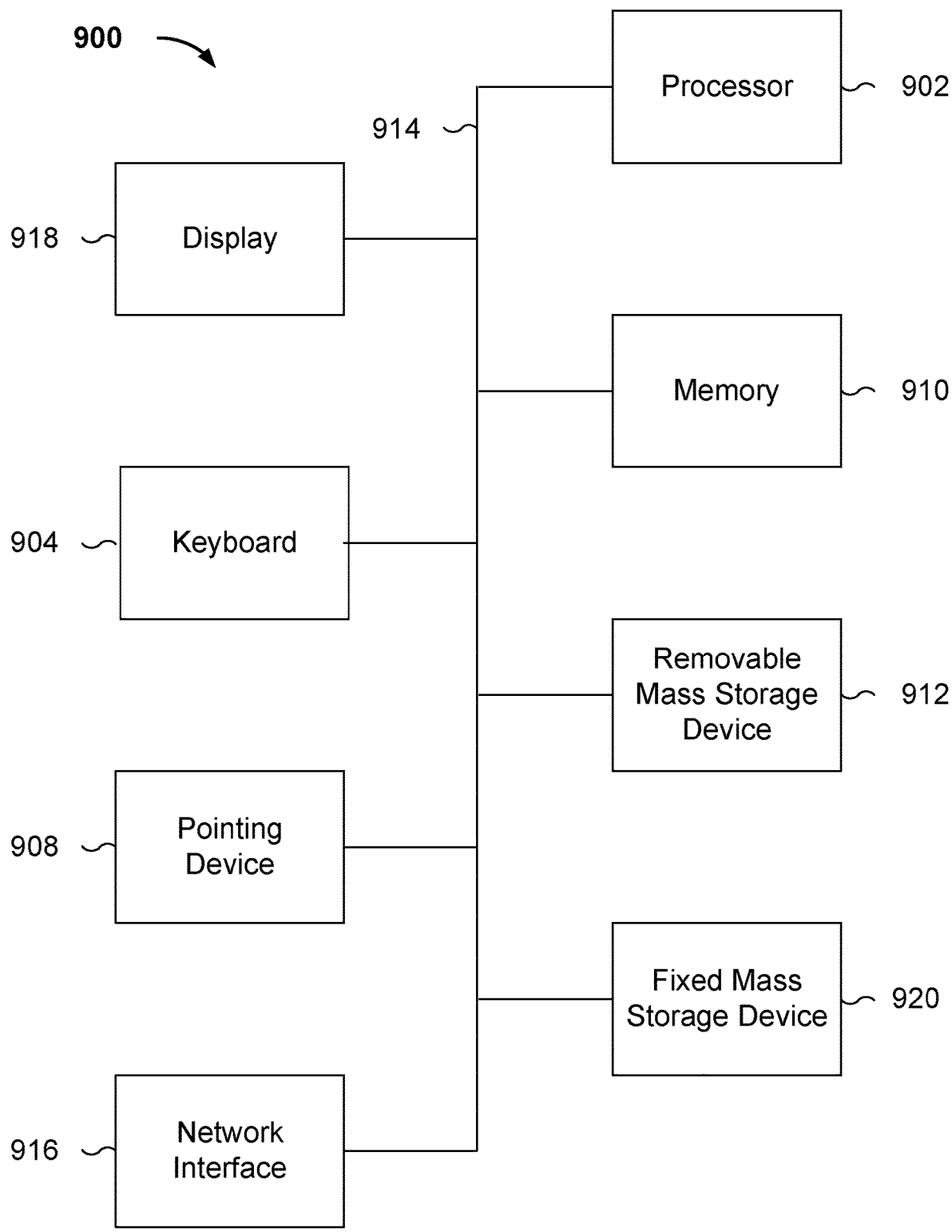
FIG. 9 is a functional diagram illustrating an embodiment of a programmed computer system for action processing associated with a cloud device.

FIG. 9 is a functional diagram illustrating an embodiment of a programmed computer system for action processing associated with a cloud device. As will be apparent, other computer system architectures and configurations can be used to process actions associated with a cloud device. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918).

Processor 902 is coupled bi-directionally with memory 910, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 910 can include any suitable computer readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900 and is coupled either bi-directionally (read/write) or uni-directionally (read only) to processor 902. For example, storage 912 can also include computer readable media such as magnetic tape, flash memory, PC-CARDS, portable mass storage devices, holographic storage devices, and other storage devices. A fixed mass storage 920 can also, for example, provide additional data storage capacity. The most common example of fixed mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display 918, a network interface 916, a keyboard 904, and a pointing device 908, as well as an auxiliary input/output device interface, a sound card, speakers, and other subsystems as needed. For example, the pointing device 908 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

For example, computer system 900 may comprise a smart device or a cloud device.

It should be noted that in the several embodiments provided by the present invention, the disclosed system, device, and method may be realized in other ways. For example, the device embodiment described above is merely illustrative. For example, the delineation of units is merely a delineation according to local function. The delineation can take a different form during actual implementation.

Units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

In addition, all the functional units in the various embodiments of the present invention could be integrated in a processing unit. Or each unit could physically exist on its own, or two or three or more units could be integrated into one unit. The aforesaid integrated units can take the form of hardware, or they can take the form of hardware combined with software function units.

The units described above, in which the software function units are integrated, can be stored in a computer-readable storage medium. The software function units described above are stored in a storage medium and include a number of instructions whose purpose is to cause a piece of computer equipment (which can be a personal computer, a server, or network computer) or a processor to execute some of the steps in the method described in the various embodiments of the present invention. The storage medium described above encompasses: USB flash drive, mobile hard drive, read-only memory (ROM), random access memory (RAM), magnetic disk, or optical disk, or various other media that can store program code.

The preferred embodiments of the present invention that are described above are merely that and do not limit the present invention. Any modification, equivalent substitution, or improvement that is made in keeping with the spirit and principles of the present invention shall be included within the protective scope of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a device profile from a development device, wherein the device profile comprises a document comprising a set of event-related configuration information comprising correspondences among event identifiers, action identifiers, and destination device identifiers;
use the device profile to locally store event registration information including the correspondences among the event identifiers, the action identifiers, and the destination device identifiers;
in response to a trigger comprising receiving a forwarding instruction from a control device or receiving an event message from an event detection smart device, use the trigger and the locally stored event registration information to determine at least an action identifier and a recipient smart device, wherein the action identifier corresponds to a control instruction to be executed at the recipient smart device;
send an action message to the recipient smart device, wherein the action message comprises at least the action identifier;
receive a first action response message from the recipient smart device, wherein the first action response message comprises the action identifier and a first action status identifier, wherein the first action status identifier is associated with a first execution status of the control instruction at the recipient smart device;
determine that a second action response message from the recipient smart device has not been received within a set period of time since receiving the first action response message, wherein the second action response message comprises the action identifier and a second action status identifier, wherein the second action status identifier is associated with a second execution status of the control instruction at the recipient smart device, wherein the first execution status is different from the second execution status;
in response to the determination that the second action response message from the recipient smart device has not been received within the set period of time since receiving the first action response message, determine whether a number of times that the action message has been resent to the recipient smart device has met a resend upper limit; and
in response to a determination that the number of times that the action message has been resent to the recipient smart device has not met the resend upper limit, resend the action message to the recipient smart device; and
a memory coupled to the processor and configured to provide the processor with instructions.

2. The system of claim 1, wherein the forwarding instruction comprises the control instruction and a destination device identifier associated with the recipient smart device.

3. The system of claim 2, wherein the processor is further configured to:
use stored pre-established correspondences between control instructions and the action identifiers to determine that the action identifier corresponds to the control instruction included in the forwarding instruction; and
include the action identifier in the action message.

4. The system of claim 1, wherein the event message comprises an event identifier and a destination device identifier, wherein the event message is sent from the event detection smart device in response to an event associated with the event identifier having been detected at the event detection smart device.

5. The system of claim 4, wherein the processor is further configured to:
determine that the recipient smart device is associated with the destination device identifier, wherein the event detection smart device and the recipient smart device are the same smart device;

determine, based at least in part on the locally stored event registration information, that the action identifier corresponds to the event identifier included in the event message; and include the action identifier in the action message.

6. The system of claim 4, wherein the processor is further configured to:

determine that the recipient smart device is associated with the destination device identifier, wherein the event detection smart device is different from the recipient smart device;

determine, based at least in part on the locally stored event registration information, that the action identifier corresponds to the event identifier included in the event message; and include the action identifier in the action message.

7. The system of claim 1, wherein the device profile is specific for the recipient smart device.

8. The system of claim 1, wherein the device profile is general to a plurality of smart devices, wherein the plurality of smart devices includes the recipient smart device.

9. The system of claim 1, wherein the first action status identifier comprises data indicating that the action message has been received at the recipient smart device, data indicating that preparatory work of an action associated with the action identifier according to one or more control arguments has been completed at the recipient smart device, data indicating that the action associated with the action identifier according to the one or more control arguments has been completed at the recipient smart device, or data indicating that an exception has occurred in relation to the action executed according to the one or more control arguments at the recipient smart device.

10. The system of claim 1, wherein the action message further comprises a destination device identifier associated with the recipient smart device, and wherein the processor is further configured to determine that the destination device identifier matches an authorized device identifier included in a preset list of authorized device identifiers.

11. The system of claim 1, wherein the action message further includes one or more control arguments.

12. A method, comprising:

receiving a device profile from a development device, wherein the device profile comprises a document comprising a set of event-related configuration information comprising correspondences among event identifiers, action identifiers, and destination device identifiers;

using the device profile to locally store event registration information including the correspondences among the event identifiers, the action identifiers, and the destination device identifiers;

in response to a trigger comprising receiving a forwarding instruction from a control device or receiving an event message from an event detection smart device, using the trigger and the locally stored event registration information to determine at least an action identifier and a recipient smart device, wherein the action identifier corresponds to a control instruction to be executed at the recipient smart device;

sending an action message to the recipient smart device, wherein the action message comprises at least the action identifier;

receiving a first action response message from the recipient smart device, wherein the first action response message comprises the action identifier and a first action status identifier, wherein the first action status identifier is associated with a first execution status of the control instruction at the recipient smart device;

determining that a second action response message from the recipient smart device has not been received within a set period of time since receiving the first action response message, wherein the second action response message comprises the action identifier and a second action status identifier, wherein the second action status identifier is associated with a second execution status of the control instruction at the recipient smart device, wherein the first execution status is different from the second execution status;

in response to the determination that the second action response message from the recipient smart device has not been received within the set period of time since receiving the first action response message, determining whether a number of times that the action message has been resent to the recipient smart device has met a resend upper limit; and in response to a determination that the number of times that the action message has been resent to the recipient smart device has not met the resend upper limit, resending the action message to the recipient smart device.

13. The method of claim 12, wherein the forwarding instruction comprises the control instruction and a destination device identifier associated with the recipient smart device.

14. The method of claim 13, further comprising:

using stored pre-established correspondences between control instructions and the action identifiers to determine that the action identifier corresponds to the control instruction included in the forwarding instruction; and including the action identifier in the action message.

15. The method of claim 12, wherein the event message comprises an event identifier and a destination device identifier, wherein the event message is sent from the event detection smart device in response to an event associated with the event identifier having been detected at the event detection smart device.

16. The method of claim 15, further comprising:

determining that the recipient smart device is associated with the destination device identifier, wherein the event detection smart device and the recipient smart device are the same smart device;

determining, based at least in part on the locally stored event registration information, that the action identifier corresponds to the event identifier included in the event message; and including the action identifier in the action message.

17. The method of claim 15, further comprising:

determining that the recipient smart device is associated with the destination device identifier, wherein the event detection smart device is different from the recipient smart device;

determining, based at least in part on the locally stored event registration information, that the action identifier corresponds to the event identifier included in the event message; and including the action identifier in the action message.

18. A computer program product, the computer program product being embodied in a non-transitory computer readable storage medium and comprising computer instructions for:

receiving a device profile from a development device, wherein the device profile comprises a document comprising a set of event-related configuration information comprising correspondences among event identifiers, action identifiers, and destination device identifiers;

using the device profile to locally store event registration information including the correspondences among the event identifiers, the action identifiers, and the destination device identifiers;

in response to a trigger comprising receiving a forwarding instruction from a control device or receiving an event message from an event detection smart device, using the trigger and the locally stored event registration information to determine at least an action identifier and a recipient smart device, wherein the action identifier corresponds to a control instruction to be executed at the recipient smart device;

sending an action message to the recipient smart device, wherein the action message comprises at least the action identifier;

receiving a first action response message from the recipient smart device, wherein the first action response message comprises the action identifier and a first action status identifier, wherein the first action status identifier is associated with a first execution status of the control instruction at the recipient smart device;

determining that a second action response message from the recipient smart device has not been received within a set period of time since receiving the first action response message, wherein the second action response message comprises the action identifier and a second action status identifier, wherein the second action status identifier is associated with a second execution status of the control instruction at the recipient smart device, wherein the first execution status is different from the second execution status;

in response to the determination that the second action response message from the recipient smart device has not been received within the set period of time since receiving the first action response message, determining whether a number of times that the action message has been resent to the recipient smart device has met a resend upper limit; and in response to a determination that the number of times that the action message has been resent to the recipient smart device has not met the resend upper limit, resending the action message to the recipient smart device.

19. The system of claim 1, wherein the recipient smart device comprises one or more of the following: a smart home device, a smart network device, a smart automobile, a smart wearable device, and a smart medical device.

20. The computer program product of claim 18, wherein the forwarding instruction comprises the control instruction and a destination device identifier associated with the recipient smart device.

21. The computer program product of claim 20, further comprising computer instructions for:

using stored pre-established correspondences between control instructions and the action identifiers to determine that the action identifier corresponds to the control instruction included in the forwarding instruction; and including the action identifier in the action message.

\* \* \* \* \*